Figure 1:
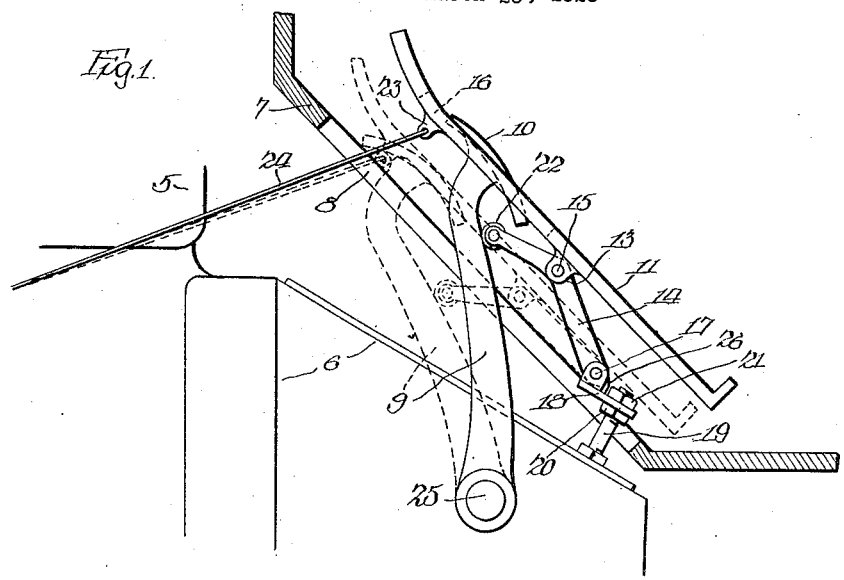

Aug. 11, 1925.

W. DAVIS 1,549,347

DUAL CONTROLLING DEVICE FOR MOTOR VEHICLES

Filed March 23, 1925

Inventor:
William Davis
By Chas. E. Tillman
Atty.

Patented Aug. 11, 1925.

1,549,347

UNITED STATES PATENT OFFICE.

WILLIAM DAVIS, OF CHICAGO, ILLINOIS.

DUAL CONTROLLING DEVICE FOR MOTOR VEHICLES.

Application filed March 23, 1925. Serial No. 17,512.

*To all whom it may concern:*

Be it known that I, WILLIAM DAVIS, a citizen of the United States, residing at Chicago, in the county of Cook and State of Illinois, have invented certain new and useful Improvements in a Dual Controlling Device for Motor Vehicles, of which the following is a specification.

The present invention relates to controlling mechanism for motor driven vehicles, and embodies improvements in or over the structure disclosed in Letters Patent No. 1,527,152, issued to me on the 17th day of February, 1925, for improvements in a dual controlling device for motor vehicles, and like said patented structure or invention, has for one of its objects the provision of a foot operated mechanism for the control of the accelerator of a motor driven vehicle, particularly one of the Ford type, but not restricted thereto in its use, which can be easily applied thereto without any material alteration in the standard equipment thereof, and which is capable of prompt, simple and accurate operation for controlling the supply of motive power to a driven member of the vehicle, and applying the brakes thereof, and so associated with the brake lever of the vehicle as to enable the accelerator or said lever to be operated by one foot of the chauffeur or driver without removing his said foot from the pedal used for operating the accelerator.

More specifically, another object of the present invention is, the provision of means wherein a foot rest or pedal shall be so constructed, mounted and arranged with respect to the upper portion of the brake lever and in such cooperation therewith that the whole weight of the foot can be supported by said pedal and lever in a restful, and bodily movable manner, yet in such a way that the upper end of the brake lever shall be independently exposed to the action of the foot for application of the brakes of the vehicle, and so that in the movement of the pedal and brake lever from the normal position of the former and from the brake released position of the lever, in the operation of applying the brakes, the relative normal position of the pedal with respect to the inclined portion of the foot-board of the vehicle will be maintained and the pressure distributed between the lever and pedal.

Still another object is to provide cooperating means between the pedal and brake lever whereby the movement in one direction from its brake released position will be automatically stopped.

Other objects and advantages of the invention will be disclosed in the following description and explanation, which will be more readily understood and read in conjunction with the accompanying drawing, in which the embodiment of which the invention is susceptible is illustrated, it being understood that changes and modifications may be resorted to without departing from the spirit of the invention, so long as they fall within the scope of the appended claims forming a part hereof.

As the particular or specific form of the mechanism for operating the accelerator forms no part of my present invention but as any suitable mechanism for such purpose may be employed, I have not deemed it necessary to illustrate the same but have shown in the drawing only such parts to which the present invention is directed, and will hereinafter describe them.

In the drawing,—

Figure 2:
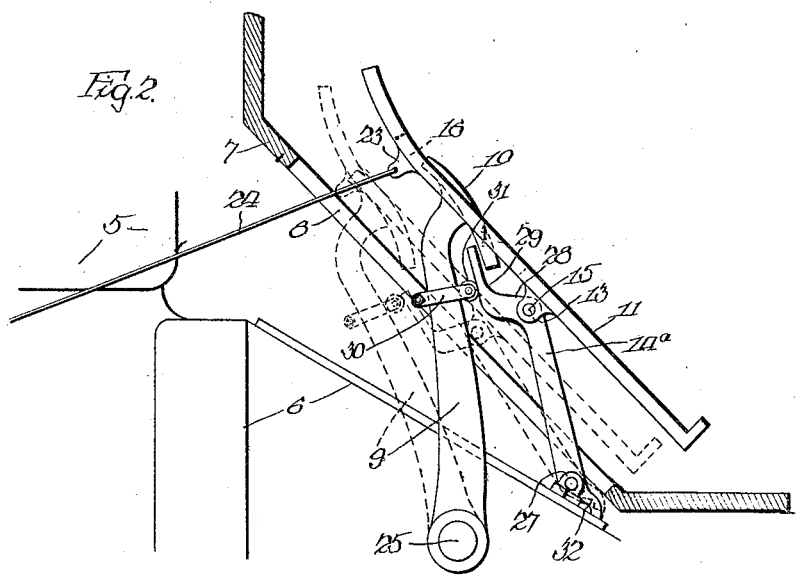

Fig. 1 is a view in side elevation of a portion of the engine, a part of the transmission case and a fragment of the body of an automobile of the Ford type showing one form of the invention mounted on the inclined portion of the foot board of said body, illustrating the parts by continuous lines in their normal positions and by dotted lines in about the positions the parts will occupy when the brakes are applied, and Fig. 2 is a similar view of like parts illustrating a modification in the construction thereof.

Like numerals of reference refer to corresponding parts throughout the different views of the drawing.

Referring now more particularly to Fig. 1 of the drawing, the reference numeral 5 designates a portion of the engine, 6 a part of the transmission casing and 7 a fragment of the body and foot board of a vehicle or automobile of the Ford type, which body may be mounted on the frame of the vehicle in the ordinary or well known way. The upwardly inclined foot board of said body is provided with a vertically disposed slot 8 which is located above the transmission casing 6 and near the side thereof on which the brake lever 9 is mounted and as shown said slot extends from the lower part or extremity of the inclined foot board to near the upper extremity thereof, and has extended therethrough the brake lever 9 which is by preference provided at its upper end with a vertically elongated enlargement or head 10 to provide a foot rest for one of the feet of the chauffeur or driver.

For co-operation with the upper portion of the brake lever 9 a pedal, designated as a whole by the numeral 11 is employed, which pedal is provided between its ends with a pair of downwardly extended spaced and transversely apertured lugs 13 between which lugs a supporting arm 14 is pivotally mounted between its ends by means of a pivot 15 extended through a suitable opening in said arm and the co-inciding openings of the above mentioned lugs. Forwardly of the pivot 15, the pedal 11 is provided with a longitudinally extended opening 16 for the reception and operation of the head 10 of the brake lever. This opening 16 may be in the form of an unbroken opening or in the form of a recess as shown in Figs. 3 and 4 of my above named patent, either of which constructions will enable the pedal to be tilted on its fulcrum or moved bodily independently of the brake lever, as is evident. The supporting arm 14 is by preference upwardly bent or deflected as shown in Fig. 1 and has its lower end pivotally connected to an upright bracket 17 mounted on the upper surface and front portion of a plate 18 which is secured on the upper portion of a screw-threaded bolt 19 in screw engagement at its lower end with the top of the transmission casing 6 near the rear end thereof. This bolt 19 is extended upwardly through the slot 8 of the foot rest 7 of the vehicle body, which position permits the plate 18 to be readily placed on the upper portion of said bolt where it may be held by means of nuts 20 and 21 located above and below said plate which as shown, has its front portion disposed longitudinally within the slot 8 the side walls of which slot will prevent lateral movement of said plate. It is obvious that by means of the nuts 20 and 21 the position of the plate 18 with respect to the top of the casing 6, as well as with respect to the foot board of the vehicle body can be suitably adjusted and maintained. The front end of the arm 14 has journaled therein a roller 22 for constant contact with the rear surface of the brake lever below the head 10 of the latter.

Pivotally connected at one of its ends to a depending lug 23 on the lower front portion of the pedal 11 is one end of a rod 24 leading to the valve of an accelerator not shown or to a mechanism of the construction shown in my aforesaid patent, if desired, for operating said valve by proper manipulation of the pedal.

It will be understood that the brake lever 9 is mounted on a shaft 25 transversely journaled in the casing 6 and that the brake mechanism operated by said lever may be of the well known kind employed in the Ford type of vehicles or any other type in which a brake lever having back and forth movement for applying and releasing the brakes is employed. The supporting arm 14 is provided at its lower extremity, that is, rearwardly of its terminal pivot, with a stop projection 26, which projection contacts with the upper surface of the plate 18 when the supporting arm 14 and the brake lever 9 are in their normal positions as shown by full lines in the drawing.

In Fig. 2 a modification in the construction of the supporting arm for the pedal 11 and in the means for providing rolling or sliding movement between the upper portion of the brake lever and the upper part of the modified supporting arm 14ª, which arm as is shown in Fig. 2, is pivotally connected at its lower end to a bracket 27 extended upwardly from the rear portion of the top of the transmission casing 6 at a point directly below the lower portion of the slot 8 through which slot the arm 14ª is extended. This arm is provided between its ends with an elbow portion 28, which portion is pivoted to the depending bracket 13 of the pedal and said arm has a forward and upward extension 29 located longitudinally with respect to the brake lever 9 and at a slight distance rearwardly from said lever. A clamp 30 surrounding the upper portion of the brake lever 9 carries a roller 31 to contact with the surface of the extension 29 adjacent the brake lever.

The lower end of the arm 14ª is provided with a stop projection 32 which as shown in Fig. 2 is extended rearwardly and downwardly from the terminal pivot of said arm and is adapted to rest against the top of the transmission casing 6 when the parts of the mechanism are in their normal positions as shown by continuous lines in Fig. 2.

From the foregoing and by reference to the drawing it will be readily understood and clearly seen that by my improvements a very simple, inexpensive, and efficient foot operated device for controlling the accelerator of an automobile and for applying the brakes thereof is provided, and also that by reason of the peculiar construction, arrangement and cooperation of the various parts of the device, means for supporting the whole weight of the foot in a comfortable and natural manner, as well as to permit of the pivotal as well as bodily movement of the pedal so that either the accelerator or the brake lever can be operated as desired, and so that the pressure of the foot will be distributed partly to the brake lever and partly to the pedal when the brakes are being applied. Furthermore, it will be understood that means is furnished for causing the pedal to assume and maintain a position substantially parallel to the inclined portion of the foot board of the vehicle when in its normal position as well as when depressed or moved for the actuation of the brake lever. It will be understood that the spring employed in the brake mechanism will normally hold the brake lever 9 in its brake released position as shown by continuous lines in the drawing and that by reason of the connection through the instrumentality of the supporting arm for the pedal with the brake lever said pedal will be held in a substantially parallel position with respect to the inclined portion of the foot board. It is obvious that my improvements afford very simple means for mounting the device on a vehicle, and especially that of the Ford type, for it is apparent that a single supporting member such as the bolt 19 or the bracket 27 only is required to pivotally support the pedal carrying arm. Moreover, it will be understood that by means of the nuts 20 and 21 on the bolt 19 the supporting arm 14 and pedal 11 can be adjusted vertically with respect to the casing 6 and the foot board 7 of the vehicle.

Having thus fully described my invention, what I claim as new and desire to secure by Letters Patent is:—

1. A device of the class described including in combination, an upwardly extended brake actuating lever, a pedal, an upwardly extended arm pivoted between its ends on said pedal between the ends of the latter, said arm pivotally mounted at its lower end and adapted at its upper portion to exert pressure on the upper portion of said lever.

2. A device of the class described including in combination, an upwardly extended brake actuating lever, a pedal, an upwardly extended arm pivoted between its ends on said pedal between the ends of the latter, said arm pivotally mounted at its lower end and adapted at its upper portion to exert pressure on the upper portion of said lever, and a connection operatively uniting said pedal to a part to be operated on its movement in one direction.

3. In a device of the class described, the combination with an upwardly extended brake actuating lever, of a pedal associated with the upper end of said lever so as to permit exposure of said end to the foot of the operator while on said pedal, an upwardly extended arm located beneath said pedal and pivotally connected between its ends thereto between the ends of the latter, said arm pivotally mounted at its lower end and arranged at its upper portion to exert pressure on the upper portion of said lever.

4. A device of the class described including in combination an upwardly extended brake actuating lever, a pedal, an upwardly extended arm pivoted between its ends on said pedal between the ends of the latter, said arm pivotally mounted at its lower end and having at said end a projection adapted to contact with a fixed part and to provide a stop for restricting the movement of said arm in one direction, and co-operating means on the upper portions of said arm and the brake lever for providing rolling or sliding contact between said portions.

5. A device of the class described including in combination an upwardly extended brake actuating lever, a pedal, an upwardly extended arm pivoted between its ends on said pedal between the ends of the latter, said arm pivotally mounted at its lower end and having at said end a projection adapted to contact with a fixed part and to provide a stop for restricting the movement of said arm in one direction, co-operating means on the upper portions of said arm and the brake lever for providing rolling or sliding contact between said portions, and a connection operatively uniting said pedal to a part to be operated upon its movement in one direction.

6. A device of the class described including in combination an upwardly extended brake actuating lever, a pedal, an upwardly extended arm pivoted between its ends on said pedal between the ends of the latter, said pedal associated with the upper end of said lever so as to permit exposure of said end to the foot of the operator while on the pedal, said arm pivotally mounted at its lower end and having at said end a projection adapted to contact with a fixed part and to provide a stop for restricting the movement of said arm in one direction, a roller journaled on the upper end of said arm and arranged for rolling contact with the upper portion of the brake lever, and a connection operatively uniting said pedal to a part to be operated upon its movement in one direction.

WILLIAM DAVIS.